United States Patent Office 3,232,932
Patented Feb. 1, 1966

3,232,932
PROCESS FOR THE PRODUCTION OF DIOXAZINES AND NEW PRODUCTS OBTAINED THEREBY
Kurt E. Burdeska, Basel, Jost von der Crone, Riehen, near Basel, Raphael Menasse, Basel, and André Pugin, Riehen, near Basel, Switzerland, assignors to J. R. Geigy A.-G., Basel, Switzerland
No Drawing. Filed Jan. 21, 1963, Ser. No. 252,591
Claims priority, application Switzerland, Jan. 25, 1962, 926/62; Sept. 6, 1962, 10,610/62
22 Claims. (Cl. 260—246)

The present invention relates to a novel process for the production of dioxazines, as well as to novel products which comprise pigments obtainable by said process.

Dioxazines, which have been used primarily as pigments, have been produced on an industrial scale from chloranil which is converted, for instance, to 2,5-dichloro-3,6-diamino-p-benzoquinone [J.A. Chem. Soc. 57, 1847 (1935)] and by acylation with an acylating agent such as acetic anhydride to the corresponding acylamino derivative; the latter is then further condensed and then cyclized with an aromatic amine, whereby the corresponding dioxazine is obtained. The known processes suffer from the drawbacks of relatively low overall yields, which are due to losses particularly in the initial stages of the process, and of relatively limited applicability with regard to the aforesaid acylation step; for instance, acylation with benzoic acid anhydride or chloride does not lead to industrially satisfactory results.

It is, therefore, an object of the present invention to provide a novel process for the production of dioxazines which affords higher yields and wider applicability than the known processes.

It is another object of the invention to provide novel intermediates in the production of dioxazines, and for the production of novel pigments, obtainable by said novel process.

These objects are attained by the process according to the invention, as illustrated in the flowsheet below, which process for the production of dioxazines comprises the following steps:

(a) Mixing and heating at from about 30° to 250° C. a readily available starting compound of the formulae (Ia) 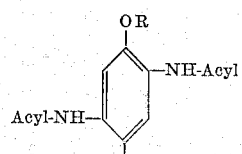

(Ib) 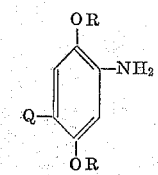

(Ic) 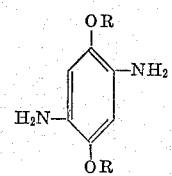

wherein

R is a lower alkyl, a benzyl or a phenyl radical,
Q is chlorine, bromine, or fluorine, a phenoxy or a lower alkoxy radical, and Acyl is an unsubstituted alkanoic acyl radical, a chloroalkanoic acyl radical, a bromo-alkanoic acyl radical, an alkoxy-alkanoic acyl radical, a cyclo-alkanoic acyl radical, an aralkanoic acyl radical, a benzoic acyl radical, a naphthoic acyl radical, or an alkoxy carbonyl radical, with an acylating agent which is either a compound of the formula

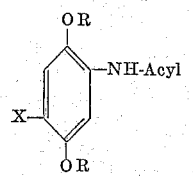

or a compound of the formula Acyl—Y
wherein

Acyl has the above-given meanin, and
Y is chlorine or bromine,
and separating the resulting compound of the formula $$\begin{array}{c} OR \\ | \\ \text{X—}\bigcirc\text{—NH-Acyl} \\ | \\ OR \end{array} \quad (II)$$

wherein

X is a phenoxy, or lower alkoxy radical, —NH—Acyl, chlorine, bromine and fluorine, depending on the nature of the starting material, and
R and Acyl have the aforesaid meanings, from the reaction mixture.

Step (a) is suitably carried out in an inert organic solvent preferably an unsubstituted or halogenated aromatic hydrocarbon.

When step (a) is carried out with a mixture of a compound of the formula Acyl—Y, an acid binding agent is used which is preferably an alkali metal acetate or an alkaline earth metal oxide, carbonate or hydroxide.

More particularly, the intermediate compounds of Formula II can contain the following groups: as alkoxy substituents, methoxy, ethoxy, propoxy or butoxy groups; as aralkoxy substituents, benzyloxy groups; as phenoxy substituents, phenoxy groups which may be substituted in the nucleus such as phenoxy, methyl or halogenophenoxy groups.

Advantageously an acylamino-1,4-dialkoxybenzene having low alkoxy groups is used as intermediate II, particularly a dimethoxy- or diethoxy-acylaminobenzene compound.

Preferred intermediates II are 2,5-diacylamino-1,4-dialkoxybenzenes and 2-acylamino-5-halogen-1,4-dialkoxybenzenes. "Halogen" therein means, for example, bromine, fluorine or particularly chlorine. The acyl radical of the acylamino groups is derived, for example, from aliphatic carboxylic acids, more particularly unsubstituted alkanoic acids, preferably of not more than 18 carbon atoms, such as formic acid, acetic acid, propionic acid, butyric acid, valeric acid, caproic acid, caprylic acid, caprinic acid, lauric acid, palmitic acid or stearic acid, chloro- or bromo-substituted alkanoic acids of preferably not more than 4 carbon atoms, e.g., chloro- or bromoacetic acid, α- or β-chloropropionic acid or α- or β-bromopropionic acid, alkoxy-substituted alkanoic acids in which alkoxy is preferably of 1 to 4 carbon atoms and the total number of carbon atoms of which does preferably not exceed 10 carbon atoms, methoxy- or ethoxy-acetic acid, from aminoalkanoic acids which may be N-, preferably lower alkyl or N-aryl-substituted, and the total number of carbon atoms of which does preferably not exceed 10 carbon atoms, aminoacetic acid, α- or β-aminopropionic acid, or N-phenyl-amino acetic acid, from an alkenoic acid of preferably not more than 5 carbon atoms, acrylic or methacrylic acid or from cycloalkanoic acids such as cyclohexane carboxylic acid, from aralkanoic acid, from aralkanoic and aralkenoic acids of preferably not more than 10 carbon atoms each, such as phenylacetic acid, α- or β-phenylpropionic acid, α-phenylacrylic acid or cinnamic acid, from aromatic carbocyclic carboxylic acids with preferably not more than 12 carbon atoms, such as benzoic acid, methyl-, chloro-, methoxy- or nitro-benzoic acids, α- or β-naphthoic acid, from aromatic heterocyclic carboxylic acids having preferably not more than 8 carbon atoms and nitrogen as hetero atom such as pyridine carboxylic acids; as an alkoxy-carbonyl radical with preferably not more than 8, and most advantageously from 4 to 6 carbon atoms, derived from monoesters of carbonic acid with alkanols or with polyalkylene glycol monoalkyl ethers, as a carbamyl radical with preferably not more than 9 carbon atoms, derived from carbamic or thiocarbamic acids such as methyl-, ethyl- or phenyl- or carbamic acid, or, as an alkyl sulfonyl or aryl sulfonyl radical with preferably not more than 10 carbon atoms, derived from organic sulfonic acids such as methane-, ethane, benzene- or p-toluene-sulfonic acid or from cyclic carboxylic acids such as cyanuric acid or derivativies thereof, preferably 2,4-di- or 2,4,6-trichloro-s-triazine, 2,4,5,6-tetrachloro pyrimidine, or 2,3-dichloroquinoxaline.

The aforesaid intermediates II are obtained, for example, by acylating the corresponding amino-1,4-dialkyloxybenzene compounds with suitable acylating agents such as, e.g. with the halides or anhydrides of organic carboxylic acids, the halides of carbonic acid monoesters as well as the halides of organic sulfonic acids or with the halides of cyclic carbonic acid imides or with inner anhydrides such as ketenes or isocyanates.

(b) Mixing the recovered compound of Formula II in a liquid medium inert to oxidation with nitric acid having a strength of at least 0.5-normal, at a temperature of about 10° to 100° C., thereby oxidizing the last-mentioned compound to the corresponding one of the formula

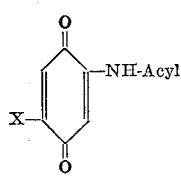

(III)

wherein

Acyl and X have the aforesaid meanings, and separating the latter compound from the reaction mixture.

It is very surprising that this treatment, which can be effected successfully even with nitric acid of high concentration such as fuming nitric acid, affords an excellent oxidation with high yields of products of Formula III in which even highly susceptible radicals —NH—Acyl are left intact. It becomes thus possible to subject compounds of Formula II with a large variety of substituents to this treatment of step (b), among which there are the benzoyl and other interesting radicals, leading to intermediates of Formula III which are themselves, or can, in turn, be converted by the next following step (c) to compounds which are surprisingly useful as fungicides.

It is especially surprising that, with the preferred oxidizing agent, nitric acid, the oxidation proceeds so easily with replacement of the ether groups by carbonyl oxygen without saponification of the acylamino groups and also that no other great changes are caused. The easy formation of 2,5-bis-acylamino-1,4-benzoquinones from 2,5-bis-acylamino-1,4-dialkoxy, -aralkoxy- and -phenoxy-benzenes is also surprising in view of the papers by Roger Adams and coworkers (see, e.g., J. Am. Chem. Soc. 72, (1950) page 4601, 5154) who have shown by many examples that in the oxidation of p-bis-acylamido-benzenes and p-bis-sulfamido-benzenes, the corresponding p-quinone acylimides or p-quinone sulfimides are formed which are capable of various addition reactions.

In some cases it is also possible to perform the oxidation and halogenation in one step by oxidizing in the presence of halogen hydracids such as hydrochloric or hydrobromic acids.

Both the above-described oxidation to form quinones and the subsequent halogenation thereof are advantageously performed in the presence of an inert organic solvent, and this independently of whether these two operations are performed in one or two steps. Suitable solvents are, for example, glacial acetic acid or aliphatic aromatic hydrocarbons which may be halogenated such as chloroform, carbon tetrachloride, tetrachloroethane, chlorobenzenes or nitrobenzene.

Acylamino-1,4-benzoquinone compounds of the most various types are obtained by this step of the process according to the invention. Thus is is also possible to produce 2,5-diacylamino-1,4-benzoquinones, the acyl radicals of which are unsymmetrically substituted.

The strength of the nitric acid used as oxidizing agent in this step (b) ranges preferably from 8-normal $HNO_3$ to fuming nitric acid, with 10-normal $HNO_3$ being most preferred. 3 to 4 moles of nitric acid are preferably used per mole of compound of Formula II.

Very satisfactory results are obtained, with almost theoretical yield rates, when using the last-mentioned nitric acid, glacial acetic acid as the solvent in step (b) and maintaining a temperature of about 20 to 50° C. during this treatment.

(c) Mixing the aforesaid compound of Formula III in a solvent inert to halogenation, with a halogenating agent, which is preferably elementary bromine or chlorine, at about 0° to 200° C., thereby halogenating the compound of Formula III to a compound of the formula

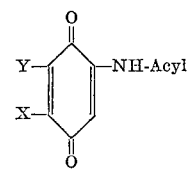

(IV)

wherein

Acyl, X and Y have the aforesaid meanings, and, preferably, separating the latter compound from the reaction mixture.

Preferably, this step (c) Is carried out with bromine as halogenating agent in an inert solvent such as chloroform, dichlorobenzene or glacial acetic acid.

(d) Mixing the aforesaid compound of Formula IV in an inert organic solvent having a boiling point of at least 70° C., and preferably above 140° C., such as a tri-lower alkyl amine—and preferably in tri-isopropyl amine to obtain optimal results—with at least two moles of an aromatic amine, at least part of the aromatic nucleus of which consists of a benzene ring substituted (1) with one —$NH_2$ group and (2) in one ortho-position thereto with a substituent which is either lower alkoxy, cycloalkoxy, mononuclear carbocyclic aralkoxy, carbocyclic aryloxy or carbocyclic arylthio;

And an acid binding agent, such as an alkali metal acetate or magnesium oxide or hydroxide, and heating at least during the final phase of the ensuing reaction at a temperature of about 140° to 300° C., and maintaining, at least throughout said final phase of said ensuring reaction, a weakly acid medium, thereby obtaining a dioxazine of the formula

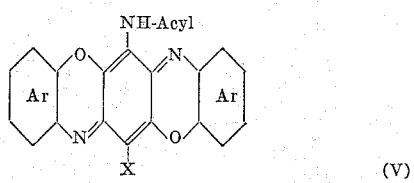

wherein

Acyl and X have the aforesaid meanings, and

Ar represents the radical of said aromatic amine, the benzene ring of which is condensed with the quinone ring of said compound of Formula IV under removal of the aforesaid substituent Z;

and recovering the dioxazine of Formula V from the reaction mixture.

The aromatic nucleus of the aromatic amine used in step (d) is in particular one of the nuclei

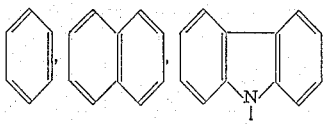

substituted in the manner defined above.

Step (d) is preferably carried out at a temperature of about 150° to 260° C. in a halogenated aromatic solvent such as dichlorobenzene, tri-chlorobenzene, nitrobenzene and chloronaphthalene, and the reaction medium of step (d) is maintained weakly acid by addition thereto of a buffering agent, preferably sodium acetate.

The condensation of the compound of Formula IV in step (d) with the aromatic amine, and the cyclization of the resulting condensate to the corresponding dioxazine can be carried out in two phases, or, preferably, in a single step.

In the latter case, the compound of the Formula IV is mixed directly with at least 2 moles of the aforesaid aromatic amine, at least part of the aromatic nucleus of which consists of a benzene ring substituted with one —NH₂ group and wherein at least one of the two ortho-positions to said —NH₂ is occupied by hydrogen while the other ortho-position is free from a substituent condensable with a quinonic oxygen atom of the compound of Formula IV;

An acid binding agent and a mild oxidizing agent, and heating at a temperature of about 140° C. to 300° C. and maintaining throughout the ensuring reaction a weakly acid medium.

The process for the production of dioxazines, according to the invention, offers several important advantages, among which is particularly easy accessibility of the starting materials of Formulas Ia, Ib and Ic, which are either commercially available materials, or can be easily produced from the latter at low cost and with excellent yields; a great variety of hitherto unsuitable substituents can now be introduced into the intermediates of Formulas III and IV, and consequently into the final dioxazines; the overall yield of the process according to the invention is very good, being above 95%, calculated on the amount of starting material of Formula I, for the product of step (b), about 85% and higher for the product of step (c) and still above 50% and as high as 70% and even better for the final dioxazine.

In constrast thereto, we have found that the comparable stage of the prior art processes leading to products falling under the Formula IV affords yield rates in the order of 45%, calculated on the amount of chloranil used as starting material.

A further important advantage of the process according to the invention resides in the much shorter time required for carrying it out in practice. Thus, where the prior art processes require, for instance, 6 hours to obtain dioxazine from chloranil, the instant process requires only about 1 hour.

Another aspect of the present invention concerns novel acylamino-1,4-benzoquinone intermediates in the production of dioxazines in the above described process.

Known acylamino-1,4-benzoquinones which have been used as intermediates in the production of dioxazine dyestuffs, are 2,5-diacetylamino- and 2,5-dibenzoylamino-1,4-benzoquinone and also 2,5-diacetylamino- or 2,5-dipropionyl - amino-3,6-dichloro-1,4-benzoquinone. The first quinone mentioned is obtained by oxidizing 2,5-diacetylaminophenol with sodium bichromate, and 2,5-dibenzoylaminobenzoquinone, 2,5-diacetylamino or 2,5-dipropionylamino-3,6-dichloro-1,4-benzoquinone are obtained by reacting 2,5-diamino-1,4-benzoquinone or 2,5-diamino - 3,6-dichloro - 1,4 - benzoquinone with benzoyl chloride or acetic acid anhydride or propionic acid anhydride respectively. Thus, they have been produced from starting materials which in themselves are not easily accessible, and with only moderate yields of acylamino compounds.

The novel acylamino-1,4-benzoquinones are distinguished from the last-described known compounds by their structure which is comprised by Formula III or Formula IV. Of particular interest as important intermediates are the compounds of the formula

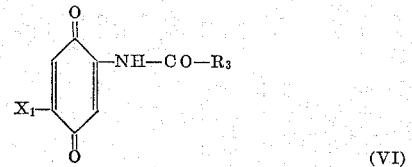

wherein $X_1$ is a member selected from the group consisting of chlorine, bromine and fluorine, and $R_3$ is a member selected from the group consisting of a chloro-substituted and a bromo-substituted alkanoic acyl radical each with maximally 4 carbon atoms, an alkoxy-substituted alkanoic acyl radical with a total of maximally 10 carbon atoms, and wherein alkoxy has maximally 4 carbon atoms; an N-unsubstituted, an N-lower alkyl-substituted and an N-phenyl-substituted amino alkanoic acyl radical, each of which has a total of maximally 10 carbon atoms, an alkenoic acyl radical with maximally 5 carbon atoms, a cyclohexane carboxylic acyl radical, an aralkanoic radical with maximally 10 carbon atoms, an aromatic carbocyclic hydrocarbon carboxylic acyl radical with maximally 12 carbon atoms, which compounds are obtained by step (b) from the corresponding starting material of Formula Ib.

Oxidation and halogenation of compounds of Formula Ib according to steps (b) and (c) of the above-described process produces among others, compounds of formula

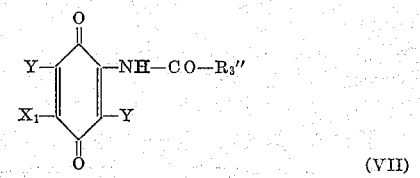

wherein $X_1$ is a member selected from the group consisting of chlorine, bromine and fluorine, Y is a member selected from the group consisting of chlorine, and bromine, and $R_3''$ is a member selected from the group consisting of a chloro-substituted and a bromo-substituted alkanoic acyl radical each with maximally 4 carbon atoms, an alkoxy-substituted alkanoic acyl radical with a total of maximally 10 carbon atoms, and wherein alkoxy has maximally 4 carbon atoms; an N-unsubstituted, an N-lower alkyl-substituted and an N-phenyl-substituted amino alkanoic acyl radical, each of which has a total of maximally 10 carbon atoms.

Oxidation in accordance with step (b) of the process according to the invention produces, among others, particularly interesting compounds of the formula

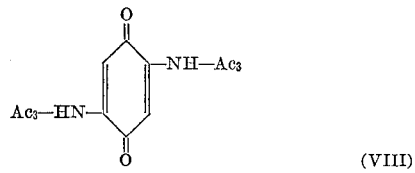

(VIII)

wherein each of $Ac_2$ and $Ac_3$ is, independently a member selected from the group consisting of a chloroalkanoic acyl radical with maximally 4 carbon atoms, a bromoalkanoic acyl radical with maximally 4 carbon atoms, an alkoxy-alkanoic acyl radical with maximally 10 carbon atoms, a cycloalkanoic acyl radical with 6–7 carbon atoms, an aralkanoic acyl radical with maximally 10 carbon atoms, a naphthoic acyl radical with maximally 12 carbon atoms, a pyradinocarboxylic acyl, and a lower alkoxy carbonyl radical, Preferably from the corresponding starting compounds of Formula Ia, when $Ac_2$ and $Ac_3$ in Formula VIII are to represent different radicals, and from starting compounds of Formula Ic when compounds of Formula VIII are desired in which $Ac_2$ and $Ac_3$ are identical.

Halogenation of the intermediates of Formula VIII in accordance with step (c) of the above-described process leads to the formation of halogenated products, of which those of the formula

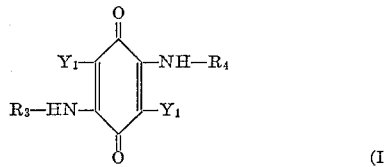

(IX)

wherein $Y_1$ is a member selected from the group consisting of chlorine and bromine, and each of $R_3$ and $R_4$ is, independently, a member selected from the group consisting of a mononuclear carbocyclic aralkanoic acyl radical of maximally 10 carbon atoms and an aromatic carbocyclic hydrocarbon carboxylic acyl radical with maximally 12 carbon atoms, are of special interest as intermediates for dioxazines which are excellent pigments.

Particularly interesting as intermediates are those of the above Formula IX in which $Y_1$ is bromine.

Further details concerning the above aspect of the invention can be seen from the following non-limitative examples. Where not otherwise stated, parts are given as parts by weight. The temperatures are in degrees centigrade. The relationship of parts by weight to parts by volume is as that of grams to cubic centimeters. The melting points were determined in a metal block and are not corrected.

EXAMPLE 1

*2,5-di-(4'-chlorobenzoylamino)-1,4-benzoquinone*

47.33 parts of 2,5 - di - (4'-chlorobenzoylamino) - 1,4-diethoxybenzene are suspended in 300 parts of glacial acetic acid. A mixture of 40 parts of 63% nitric acid and 40 parts of glacial acetic acid is poured into this suspension while stirring well. The mixture is stirred for 15 minutes at 40–50° and then cooled to 10°. The yellow 2,5-di-(4'-chlorobenzoylamino)-1,4-benzoquinone which precipitates in a very pure form is filtered off. To further purify, it is recrystallised from 1,2-dichlorobenzene or from glacial acetic acid.

M.P.: >320° (under decomposition); the yield is 96% of the theoretical.

The 2,5-di-(4'-chlorobenzoylamino) - 1,4-diethoxybenzene used as starting material is produced by reaction of 1 mol of 2,5-diamino-1,4-diethoxybenzene with 2 mols of 4-chlorobenzoyl chloride.

Other 2,5-diacylamino - 1,4 - benzoquinones characterised by their melting points are produced in the yields given if, instead of 2,5-di - (4'-chlorobenzoylamino) - 1,4-diethoxy-benzene, compounds of the formula

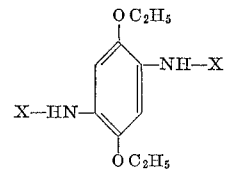

are used wherein X has the meaning given in column II of Table I, and otherwise the procedure described in the example is followed.

TABLE I
[D means under decomposition]

| Expl. No. | X | M.P. of corresponding quinone (degrees) | Yield in percent of theoretical |
|---|---|---|---|
| 2 | —COCH₃ | 300 D | 84 |
| 3 | —COC₅H₁₁ | 240 | 87 |
| 4 | —COOCH₃ | 250–260 D | 94 |
| 5 | —COOC₂H₅ | 210–211 | 94 |
| 6 | —COOCH₂CH₂—OCH₃ | 142–143 | 98 |
| 7 | —CO—C₆H₅ | 258–260 | 90 |
| 8 | —CO—C₆H₄—CH₃ | >320 D | 85 |
| 9 | —CO—C₆H₄—OCH₃ | 305–307 D | 88 |
| 10 | —CO—(Cl-C₆H₄) | 237–238 | 93 |
| 11 | —CO—(Cl-C₆H₃-Cl) | 273–275 | 85 |
| 12 | —CO—CH₂—C₆H₅ | 223–224 | 87 |
| 13 | —COCH=CH—C₆H₅ | >330 D | 84 |
| 14 | —CO—(pyridyl) (quinones isolated as HNO₃ salt) | >320 D | 84 |
| 15 | —SO₂—C₆H₅ | >260 D | 88 |
| 16 | —SO₂—C₆H₄—NO₂ | 272–273 D | 92 |
| 17 | —SO₂—CH₃ | >320 D | 87 |
| 18 | —CO—CH₂—CH₂—Cl | | |
| 19 | —COO—CH₂—CH₂—Cl | | |

EXAMPLE 20

*2-(2',4'-dichlorobenzoylamino)-5-benzoylamino-1,4-benzoquinone*

14.2 parts of 2-(2',4'-dichlorobenzoylamino)-5-benzoylamino-1,4-diethoxybenzene are suspended in 250 parts of glacial acetic acid. A mixture of 15 parts by volume of fuming nitric acid (density=1.52) and 15 parts by volume of glacial acetic acid is added while stirring to this suspension at 40°. After stirring for 20 minutes and cooling to 10°, the yellow 2-(2',4'-dichlorobenzoylamino)-

5-benzoylamino-1,4-benzoquinone formed is filtered off and washed, first with water and then with ethanol. Crystallised from glacial acetic acid, it forms long golden yellow needles. M.P. 205–207°. Yield: 87%.

The 2-(2',4'-dichlorobenzoylamino) - 5-benzoylamino-1,4-diethoxybenzene used as starting material is obtained by condensation of 1 mol of 2-amino-5-benzoylamino-1,4-diethoxybenzene with 1 mol of 2,4-dichlorobenzoyl chloride.

If, instead of 2-(2',4'-dichlorobenzoylamino)-5-benzoylamino-1,4-diethoxybenzene, compounds of the formula

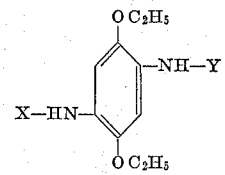

are used in which X and Y have the meanings given in columns II and III of Table II and otherwise the procedure described in the example is followed, then other 2,5-diacylamino,1,4-benzoquinones unsymmetrically substituted at the acyl groups are obtained in the yields given. The melting points are given in column IV of the table:

TABLE II
[D means under decomposition]

| Expl. No. | X | Y | M.P. of the corresponding quinones (degrees) | Yield in percent of theoretical |
|---|---|---|---|---|
| 21 | —COCH$_3$ | —CO—C$_6$H$_5$ | 236–237 D | 83 |
| 22 | —COCH$_3$ | —CO—NHC$_2$H$_5$ | 244–245 D | 88 |
| 23 | —COCH$_3$ | —SO$_2$CH$_3$ | 246–247 D | 89 |
| 24 | —COCH$_3$ | —COOC$_2$H$_5$ | 254–255 D | 86 |
| 25 | —COOCH$_3$ | —CO—C$_6$H$_5$ | 185–186 | 87 |

EXAMPLE 26

*2-chloro-5-(4'-chlorobenzoylamino)-1,4-benzoquinone*

16.8 parts of 2-chloro-5-(4'-chlorobenzoylamino)-1,4-dimethoxybenzene are finely pulverised and suspended in 100 parts by volume of glacial acetic acid. At 25°, a mixture of 20 parts of 63% nitric acid and 20 parts by volume of glacial acetic acid is poured in. The temperature rises about 10°. For a short time a strongly yellow coloured solution is formed from which the yellow quinone precipitates. The reaction mixture is stirred for another 10 minutes, then cooled to 10° and the precipitate is filtered off under suction. Still further quinone is obtained by precipitation from the filtrate with water. The quinone is first washed with water and then it is washed with a little ethanol. It is further purified by recrystallisation from glacial acetic acid and it then melts at 168°; the yield is quantitative.

Other 2-chloro-5-acylamino-1,4-benzoquinones characterised by their melting points are given in the following table. They are obtained in the yields given if instead of 2-chloro-5-(4'-chlorobenzoylamino)-1,4 - dimethoxybenzene, compounds of the formula

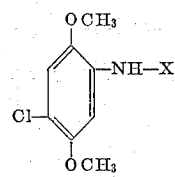

are used wherein X has the meaning given in column II of Table III and otherwise the procedure described in the example is followed.

TABLE III
[D means under decomposition]

| Expl. No. | X | M.P. of the corresponding quinones (degrees) | Yield in percent of theoretical |
|---|---|---|---|
| 27 | —COCH$_3$ | 174–175 | 93 |
| 28 | —COOCH$_3$ | 172 | 88 |
| 29 | —COOC$_2$H$_5$ | 98 | 86 |
| 30 | —SO$_2$CH$_3$ | 197–198 D | 94 |
| 31 | —SO$_2$—C$_6$H$_5$ | 181–182 | 97 |
| 32 | —CO—C$_6$H$_5$ | 152–154 | 92 |
| 33 | —CO—C$_6$H$_4$—OCH$_3$ | 187–188 | Quantitative |
| 34 | —CO—C$_6$H$_4$—CH$_3$ | 165–166 | Quantitative |
| 35 | —CO—C$_6$H$_4$—NO$_2$ | 192–193 | 96 |
| 36 | —CO·CH$_2$—C$_6$H$_5$ | 194–195 D | 97 |
| 37 | —CO—CH=CH—C$_6$H$_5$ | 240–241 D | 90 |
| 38 | —CONH—C$_6$H$_5$ | 224 D | 97 |
| 39 | —CO(CH$_2$)$_6$—CH$_3$ | 118–120 | 95 |
| 40 | —CO(CH$_2$)$_7$—CH$_3$ | 114–115 | 89 |
| 41 | —CO(CH$_2$)$_8$—CH$_3$ | 115–116 | 78 |
| 42 | —CO(CH$_2$)$_{10}$—CH$_3$ | 115–117 | 85 |
| 43 | —CO(CH$_2$)$_{14}$—CH$_3$ | 117–119 | 87 |
| 44 | —CO(CH$_2$)$_{16}$—CH$_3$ | 111–113 | 83 |
| 45 | —COOCH$_2$CH$_2$Cl | 174–175 | 92 |
| 46 | —COC$_5$H$_{11}$ | 137–138 | 92 |
| 47 | —COOCH$_2$CH$_2$OCH$_3$ | 117 | 89 |
| 48 | COO—C$_6$H$_5$ | 157 | 95 |
| 49 | —CO—CH$_2$Cl | 157–158 | 92 |
| 50 | COOC$_3$H$_7$ | | |
| 51 | COOC$_4$H$_9$ | | |
| 52 | COCHCl$_2$ | 157 | 87 |
| 53 | COCCl$_3$ | 197–198 | 89 |
| 54 | CO—C$_4$H$_3$(H) | 166–167 | 96.5 |

EXAMPLE 55

59.22 parts of the 2-chloro-5-(4'-chlorobenzoylamino)-1,4-benzoquinone obtained in Example 26 are suspended in 300 parts by volume of chloroform. At 20–30°, a mixture of 24.8 parts by volume of bromine and 50 parts by volume of chloroform is added to this suspension within 30 minutes. The reaction mixture is then stirred for 15 hours at room temperature, 300 parts by volume of ethanol are added, whereupon the temperature rises by 10 degrees, and then the whole is stirred for another hour. The reaction mixture is then cooled to 0 to 5° and the precipitated quinone is filtered off. It is washed first with water and then with ethanol and dried.

The 2 - chloro-5-(4'-chlorobenzoylamino)-3,6-dibromo-1,4-benzoquinone crystallizes from ethanol in yellow crystals.

M.P. 211°; yield 92% of the theoretical.

EXAMPLE 56

37.2 parts of 2-chloro-5-[3'-diethylamino-5'-chloro-triazinylamino-(1')] - 1,4 - dimethoxybenzene (M.P. 161–162°), produced by condensation of cyanuric chloride with one mol of 2,5-dimethoxy-4-chloroaniline and one mol of diethylamine, are suspended in 200 parts of glacial acetic acid whereupon oxidation is carried out with nitric acid in at room temperature. For a moment a solution is formed from which the quinone precipitates in crystalline form. The suspension is stirred for 10 hours at 20–25°, then cooled to 10° and filtered. The resulting 2-chloro - 5 - [3' - diethylamino-5'-chloro-triazinylamino-(1')]-1,4-benzoquinone is washed first with water and then with cold alcohol and dried. Yield: 97.4% of the theoretical.

EXAMPLE 57

When, instead of 37.2 parts of 2-chloro-5-[3'-diethylamino-5'-chloro-triazinylamino - (1')] - 1,4 - dimethoxybenzene, 40.6 parts of the condensation product from one mol 2,4,5,6-tetrachloro-pyrimidine and one mol of 2,5-dimethoxy-4-chloro-aniline and one mol of diethylamine is used and otherwise the procedure described in Example 55 is followed, then the corresponding quinone product which is a mixture of a major portion of the compound of the formula

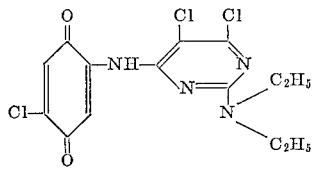

and a minor portion of the compound of the formula

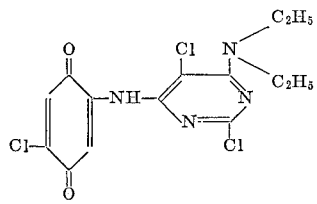

is obtained in similarly good yields.

EXAMPLE 58

39.7 parts of the condensation product of 1 mol of 2,6-dichloro-pyramidine-4-carboxylic acid chloride and 1 mol of 1-amino-4-chloro-2,5-dimethoxybenzene in 250 parts of glacial acetic acid are treated at 20 to 30° with 30 parts of 10 N nitric acid. A yellow quinone of the formula

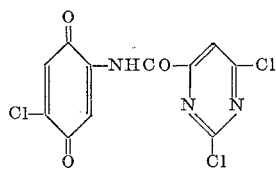

precipitates and it is isolated in the usual way.

EXAMPLE 59

A yellow quinone of the formula

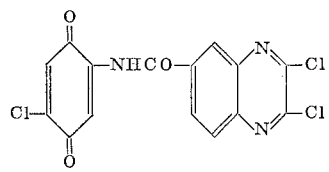

is obtained when instead of the condensation product of 2,6-dichloropyrimidine-4-carboxylic acid chloride and 1-amino-4-chloro-2,5-dimethoxybenzene, 40.25 parts of the condensation product of 1 mol of 2,3-dichloro-quinoxaline-6-carboxylic acid chloride and 1 mol of 1-amino-4-chloro-2,5-dimethoxybenzene are used and the procedure given in Example 58 is followed.

When, instead of 2-chloro-5-(4'-chlorobenzoylamino)-1,4-benzoquinone used in Example 55, compounds are used of the formula

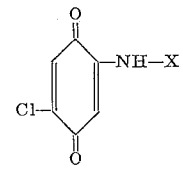

wherein X has the meaning given in column II of the following table and otherwise the procedure described in Example 55 is employed, then further 2-chloro-5-acyl-amino-3,6-dibromo-1,4-benzoquinones are obtained the melting points of which can be seen from column III of Table IV:

TABLE IV

| Expl. No. | X | M.P. (° C.) |
|---|---|---|
| 60 | CO(CH$_2$)$_6$CH$_3$ | 138–140 |
| 61 | CO(CH$_2$)$_7$CH$_3$ | 136–137 |
| 62 | CO(CH$_2$)$_8$CH$_3$ | 134–136 |
| 63 | CO(CH$_2$)$_{10}$CH$_3$ | 131–132 |
| 64 | CO(CH$_2$)$_{14}$CH$_3$ | 131–133 |
| 65 | CO(CH$_2$)$_{16}$CH$_3$ | 134–137 |
| 66 | COCH$_2$Cl | 192–193 |
| 67 | COCH$_2$CH$_2$Cl | 178–179 |
| 68 | COOCH$_2$CH$_2$Cl | 155–156 |
| 69 | —COCH$_2$—⟨C$_6$H$_5$⟩ | 186 Z |
| 70 | —COOCH$_2$CH$_2$OCH$_3$ | 126 |
| 71 | COC$_5$H$_{11}$ | 158–159 |
| 72 | COO—⟨C$_6$H$_5$⟩ | 176–177 |
| 73 | COCH$_3$ | 182 |
| 74 | COCHCl$_2$ | 208–209 |
| 75 | CO—⟨H⟩ | 175–176 |
| 76 | COCCl$_3$ | 204–205 |
| 77 | SO$_2$CH$_3$ | 201 |

EXAMPLE 78

*2,5-diacetylamino-1,4-benzoquinone*

5.6 parts of 2,5-diacetylamino-1,4-diethoxybenzene are dissolved in 50 parts by volume of concentrated sulfuric acid and 4.74 parts of potassium permanganate are added in small portions while cooling with ice. The solution is then stirred for 30 minutes and poured onto ice. The 2,5-diacetylamino-1,4-benzo-quinone which precipitates is filtered off and washed with water. The yield is 70% of the theoretical.

EXAMPLE 79

*2,5-diacetylamino-1,4-benzoquinone*

14 parts of 2,5-diacetylamino-1,4-diethoxybenzene are heated with 400 parts by volume of glacial acetic acid to 90°. At this temperature, 48 parts of 18.9% lead dioxide are added within 40 minutes, whereupon the mixture is boiled for a short time and then cooled. The precipitated 2,5-diacetylamino-1,4-benzoquinone is filtered off at 20° and washed with water. The yield is 26% of the theoretical.

EXAMPLE 80

*2,5-dibenzoylamino-1,4-benzoquinone*

17.1 parts of 1,4-diethoxy-2,5-dibenzoylaminobenzene are heated to 100° in 250 parts by volume of glacial acetic acid. At this temperature, 30 parts of dry sodium bichromate are added within 15 minutes. The reaction mixture is then cooled to 10° and the precipitated 2,5-dibenzoylamino-1,4-benzoquinone is filtered off. The yield is 40% of the theoretical.

EXAMPLE 81

*2,5-diacetylamino-3,6-dichloro-1,4-benzoquinone*

14 parts of finely pulverised 2,5-diacetylamino-1,4-diethoxybenzene are suspended in 250 parts of glacial acetic acid and 20 parts by volume of concentrated hydrochloric acid are added at 40°. 20 parts by volume of hydrogen peroxide are poured into the mixture whereupon the temperature rises. When it has attained 60°, the orange red solution is cooled to room temperature and poured into 1000 parts by volume of water. The 2,5-diacetylamino-3,6-dichloro-1,4-benzoquinone which precipitates after a short time is filtered off and washed with water. It melts at 246°; yield 71% of the theoretical.

EXAMPLE 82

*2,5-diacetylamino-3,6-dichloro-1,4-benzoquinone*

14 parts of 2,5-diacetylamino-1,4-diethoxybenzene are suspended in 200 parts by volume of glacial acetic acid and 20 parts by volume of concentrated hydrochloric acid are added. The reaction mixture is heated to 40° and anhydrous chlorine gas is introduced for 10 minutes, during which the temperature should not rise over 60°. The solution is cooled to 10° and the quinone is filtered off. The yield of 2,5-diacetylamino-3,6-dichloro-1,4-benzoquinone is 21% of the theoretical.

EXAMPLE 83

*2,5-diacetylamino-3,6-dichloro-1,4-benzoquinone*

14 parts of 2,5-diacetylamino-1,4-diethoxybenzene are suspended in 200 parts by volume of glacial acetic acid and 20 parts by volume of concentrated hydrochloric acid and 8.61 parts of potassium chlorate are added at 50–60° within 10 minutes. This mixture is stirred for 15 minutes at this temperature and then the quinone is filtered off at 10°. The yield of 2,5-diacetylamino-3,6-dichloro-1,4-benzoquinone is 35% of the theoretical.

Dioxazines which are particularly satisfactory as pigments are obtained when, in accordance with step (d) supra, a 3,6-bis-(aroylamido)-1,4-benzoquinone compound of the formula

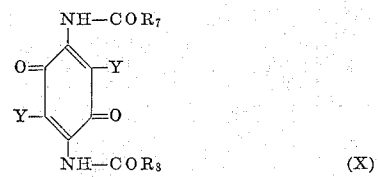

wherein Y has the aforesaid meanings, and $R_7$ and $R_8$ each represent phenyl or a naphthyl radical, is condensed simultaneously or in stages with twice the equimolar quantity of a primary aryl amine or of two different aryl amines as defined above, the aryl radicals of which contain hydrogen or a replaceable substituent in an ortho-position in relation to the $NH_2$ group and may contain other substituents, which are usual in dyestuffs and pigments, and/or may contain condensed heterocyclic rings in the remaining positions, if desired, in the presence of inert organic diluents and/or condensation agents to form a dianil of the general formula

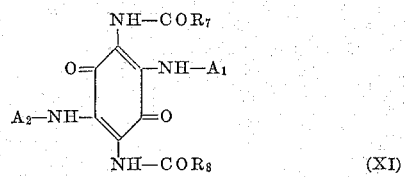

wherein $R_7$ and $R_8$ have the above meanings, and $A_1$ and $A_2$ represent, independently of each other, aryl radicals of primary aryl amines as defined above, and the dianil of Formula XI is ring-closed by means of moderate heating in diluents and, in some cases, where the primary amine contains no ether group in ortho-position to the $NH_2$-group at the above-mentioned benzene nucleus, in the presence of condensation and/or oxidizing agents, to form a compound of the formula

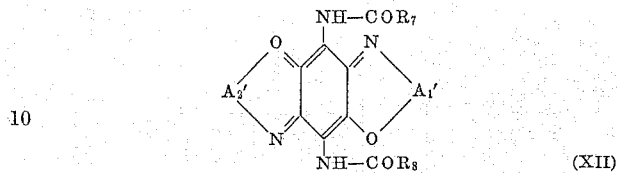

wherein $R_7$ and $R_8$ have the above meanings, and $A_1'$ and $A_2'$ represent ortho-arylene radicals corresponding to the above-defined aryl radicals $A_1$ and $A_2$.

The aryl radicals of Formulas X, XI and XII, symbolized by $R_1$ and $R_2$, are phenyl or naphthyl radicals which may be substituted, phenyl radicals being preferred. $R_1$ and $R_2$ may be similar to one another or different from one another, but preferably they are identical. The following are in particular of interest: the phenyl, the 2-, 3- or 4-methylphenyl, the 2-, 3- or 4-chlorophenyl, the 2-, 3- or 4-bromophenyl, the 2-, 3- or 4-methoxyphenyl, the 2-, 3- or 4-ethoxyphenyl, the 2-, 3- or 4-nitrophenyl, the 3,4- or 2,5-dimethylphenyl, the 3,4- 2,5- or 2,4-dichlorophenyl, 2,4,5-trichlorophenyl, the 2- or 4-methylsulfonylphenyl, the 2- or 4-sulfamylphenyl, the 2-, 3-, or 4-acylaminophenyl, the 2-, 3- or 4-sulfonylaminophenyl, the 3- or 4-carboxylic acid ester phenyl, the 3- or 4-carboxylic acid amidophenyl, the 2- or 4-(2'-, 3'- or 4'-nitrophenoxy)-phenyl, the 2- or 4-phenylphenyl-, the 4-(4'-nitrophenyl)-phenyl, the naphthyl-, the nitronaphthyl- and the chloronaphthyl-(1)- or -(2)- radicals.

Particularly pure and solvent-fast and therefore preferred dioxazine pigments of Formula XII are those wherein $R_7$ and $R_8$ represent an unsubstituted phenyl radical, while the purest shades are obtained when $R_7$ and $R_8$ represent the o-methylphenyl or o-chlorophenyl radical.

The aryl radicals, symbolized in Formula XI by $A_1$ and $A_2$, represent phenyl, naphthyl or carbazole radicals, which may be substituted; they are preferably phenyl radicals. They may be identical or different from one another; but preferably both aryl radicals are identical. As mentioned above, $A_1$ and $A_2$ contain as replaceable substituents in the ortho-position in relation to the NH-group an ether group or a thioether group. Suitable ether radicals are in particular alkoxy, cycloalkoxy, aralkoxy and above all those aryloxy groups, which may be readily split-off, namely the phenoxy, the methylphenoxy or the chlorophenoxy group.

Apart from these replaceable substituents in the ortho-position in relation to the NH group, $A_1$ and $A_2$ in Formula XI and, consequently, $A_1'$ and $A_2'$ in Formula XII, may contain substituents which are preferably non-ionic and which are usual in coloring substances, namely, aliphatic, cycloaliphatic, araliphatic or aromatic groups, alkoxy, hydroxyalkoxy, aralkoxy or aryloxy groups, the aryl radicals of the last-mentioned two groups being either non-substituted or substituted, for example, by methyl, chlorine, bromine, methoxy or carboxylic acid ester groups, an alkylmercapto or an arylmercapto group; furthermore halogens such as chlorine or bromine, the nitro, the cyano or the trifluoromethyl group, the primary amino group, carboxylic acid amide and sulfonic acid amide groups, which may be N-substituted, carboxylic acid ester, sulfonic acid aryl ester, acyl, alkylsulfonyl, arylsulfonyl and acylamino groups, "acyl" being understood in the widest sense and representing for example a carbacyl, carbonic acid monoester, carbamyl, thiocarbamyl or a 1,3,5-triazinyl radical, but preferably a carbacyl radical.

$A_1$ and $A_2$ or $A_1'$ and $A_2'$ may further contain, for example, an indol ring or a furan ring condensed with the above-defined benzene nucleus of the primary aromatic amine used as a reactant in step (d).

When, in Formula XI, $A_1$ and $A_2$ are derived from 4-alkoxyanilines, then pure, red dioxazine pigments of Formula XII are obtained; they are derived from 4-phenoxyanilines, then dioxazine pigments according to the invention are obtained, which are also of pure, red shade of even less solubility than the former.

When $R_7$ and $R_8$ represent a phenyl, an o-chlorophenyl or an o-methylphenyl group, then those pigment colors are distinguished by very interesting red shades, wherein $A_1$ and $A_2$ represent phenylene radicals, which are substituted in the p-position in relation to the nitrogen atom of the oxazine ring by a lower alkoxy group, the ethoxy group generally producing a purer shade than the methoxy group, or by a phenoxy group, which may be substituted, and contain in the p-position in relation to the oxygen atom carboxylic acid ester, carboxylic acid amide or acyl groups or halogens, if required. It is therefore a further advantage of the present invention that sparingly soluble, red colors of the dioxazine series, which are fast to migration and overpainting, are obtained by means of simple substituents.

Dioxazines with optimal pigment properties are those of the formula

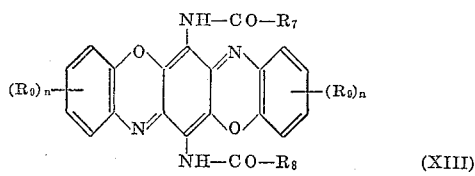

(XIII)

wherein each of $R_7$ and $R_8$ is a member selected from the group consisting of phenyl, chlorophenyl, bromophenyl and lower alkylphenyl, and $R_9$ is a member selected from the group consisting of lower alkoxy, phenoxy, chlorophenoxy, bromophenoxy, lower alkyl-phenoxy, lower alkoxy-phenoxy, and $n$ is an integer ranging from 1 to 3.

These dioxazines of Formula XIII fill a gap in the catalog of pigments; for there are no pigments of red shade and comparable strength, which possess at the same time satisfactory fastness to migration and to overpainting.

Particularly those compounds of Formula XIII in which $R_7$, $R_8$ is o-chlorophenyl or o-methylphenyl and $R_9$ is in p-position to the nitrogen atom of the oxazine ring and $n$ is 1.

The dianils of Formula XI, used in accordance with the invention, are novel. They are obtained in accordance with step (d) of the above-described process according to the invention, by reacting a 2,5-di-halogen-3,6-bis-[aroylamido]-1,4-benzoquinone with primary aryl amines, which contain hydrogen or a mobile substituent in the o-position in relation to the $NH_2$ group, for example in ethylene glycol monoethyl ether or in an aromatic hydrocarbon such as benzene, chlorobenzene or dichlorobenzene, if required in the presence of an acid neutralizing medium, such as alkali hydroxide, for example sodium hydroxide or alkaline earth oxide or -hydroxide, for example magnesium oxide, alkali carbonate, for example in the presence of an alkali salt of a low fatty acid, for example sodium acetate or of tertiary bases, such as for example tri-isopropanol amine, methyldicyclohexyl amine or tri-isobutyl amine.

The dianils of Formula XI, produced in this manner, may be isolated before their conversion to the dioxazine compounds of Formula XII. However, it is frequently advantageous to convert the substances, which are used for their production, directly into the dioxazine pigments of Formula XII without isolating these dianils.

The condensation of the compounds of Formula XI to the dioxazine pigments of Formula XII is preferably carried out, in conformity with step (d) of the above-described process, under moderate heat in inert organic solvents, in some cases in the presence of acids, acid-yielding or acid-forming compounds, if necessary in the presence of oxidizing agents. The thermal ring-closure in high boiling solvents is preferred, and, when required, oxidizing agents are used but no acid condensation agents, since the use of the latter, in contrast to the known condensations produced with chloranil, generally lead to poorer yields. In the thermal ring-closure, starting materials containing phenoxy groups as replaceable substituents are preferred, since the latter can be generally more easily split-off than alkoxy groups.

Suitable inert oragnic solvents are, in particulaar, aromatic hydrocarbons of the benzene or naphthalene series, which may be halogenated, namely: the xylenes, nitrobenzene, di- and trichlorobenzenes, naphthalene and α-chloronaphthalene, liquid alcohols with up to 12 carbon atoms and the esters thereof, such as, ethanol, propanol, benzyl alcohol, ethylene glycol, the ethylene glycol-methyl, -ethyl and -phenyl ethers, and the acetates, benzoates and phthalates thereof.

Concentrated inorganic oxygen-containing acids, such as sulfuric acid or polyphosphoric acids, and strong organic acids, such as di- or trihaloacetic acids, are suitable as acids.

Examples of acid-yielding or acid-forming compounds are in particular the acid halides of carboxylic or sulfonic acids, such as benzoyl chloride or 4-methylbenzenesulfonic acid chloride, furthermore also thionylchloride, phosphorus pentachloride or metal chlorides, such as aluminum chloride.

Atmospheric oxygen and aromatic nitro compounds, namely nitrobenzene or nitrobenzene sulfonic acids may be mentioned as suitable oxidizing agents. The choice of condensation agents and conditions is based on the starting compounds used in each particular instance.

Dianils of Formula XI, wherein $A_1$ and $A_2$ each contain an ether group in the o-position in relation to the NH-group as replaceable substituents, are heated to 100–300° C., preferably to 150–260° C., in a mixture consisting of an inert organic solvent and an acid-binding agent.

Dianils of Formula XI wherein $A_1$ and $A_2$ each contain an ether group, preferably a phenoxy group which may be substituted, in the 2- and 4-position in relation to the NH group, may be converted to the dioxazine compounds of Formula XII at relatively low temperatures and without further additives by being heated in inert organic solvents. The dianils of Formula XI wherein $A_1$ and $A_2$ each represent an aromatic radical containing a hydrogen atom in the o-position in relation to the NH group, are preferably condensed in an organic solvent in the presence of an oxidizing agent and in some cases in the presence of an acid-yielding agent.

The dioxazine compounds of Formula XII according to the invention generally crystallize out almost completely and in pure form in the hot reaction mixture. They have the characteristic properties of the dioxazine pigments, for example the blue color of the solution in concentrated sulfuric acid, metallic scintillation of the crystals and fluorescence in 1,2-dichlorobenzene. They are isolated by being filtered off and further purified by washing out the precipitate with organic solvents and aqueous acids or bases.

The dioxazines which are sparingly soluble in organic solvents are brought into a finely dispersed form for use as pigments, preferably by means of grinding in the presence of grinding assistants, such as inorganic or organic salts which may be removed by solvents, and if desired in the presence of additional grinding assistants such as organic solvents, acids or bases.

Solid or liquid organic solvents for grinding treatment may be used at room temperature. The pigments which have been isolated from the reaction mixture and dried, are ground for example with dehydrated calcium chloride or with sodium sulphate or sodium chloride in the presence of aliphatic or aromatic hydrocarbons which may be chlorinated and/or nitrated, such as cyclohexane, benzene, toluene, naphthalene, mono-, di- or trichloro-benzene, tetrachloroethane, or nitrobenzene, furthermore in the presence of low aliphatic ketones, such as for example acetone, or low aliphatic monoalcohols, for example methanol, ethanol, methoxy or ethoxyethanol, or nitrogen compounds such as dimethyl or diethylaniline, quinoline or dimethylformamide. In many cases the pigments may also be improved by grinding with organic solvents alone without the addition of salts. After grinding, the assistants are removed; for instance, the inorganic salts are dissolved, for example with water, and the organic assistants are removed by means of distillation or with water vapour.

Finely dispersed, orange, red, bordeaux, blue and violet pigments having a remarkable color strength as compared to the crude products, are obtained in this manner. They may be used for pigmenting varnishes, rubber, lacquers, for example stoving lacquer, and plastics such as polyvinylchloride. They are also particularly suitable for the production of printing inks for paper printing and for the mass dyeing of viscose and cellulose materials. The orange, red, red-brown, raisin-colored, violet and blue colorations and prints produced therewith are distinguished by a high color strength, and by good fastness to solvents, overpainting, migration, rubbing and light, and good heat stability.

Further details may be seen from the following non-limitative examples, wherein parts represent parts by weight, unless stated otherwise. Temperatures are in degrees centigrade. Parts by weight have a ratio to parts by volume as g:cm.$^3$.

EXAMPLE 84

*2,5-dibrom-3,6-bis-benzoylamino-1,4-benzoquinone*

138.6 parts of 3,6-bis-benzoylamino-1,4-benzoquinone (Example 7, supra) are suspended in 1050 parts by volume of chloroform. 166.2 parts of bromine in 100 parts by volume of chloroform are poured into this suspension within 15 minutes, whereupon the whole is boiled for 12 hours. After the addition of another 15.5 parts of bromine, the whole is boiled for a further 10 hours, then cooled to 20–25° and 200 parts by volume of ethanol are added to the suspension. It is then stirred for 10 minutes at this temperature, cooled to 0 to 5° and the mixture consisting of 2,5-bis-benzoylamino-3,6-dibromo-hydroquinone and 2,5-bis-benzoylamino-3,6-dibromo-1,4-benzo-quinone is filtered off. It is washed with ethanol and dried. The dried mixture is then suspended in 700 parts by volume of glacial acetic acid, heated to 45° and 60 parts of 63% nitric acid dissolved in 100 parts by volume of glacial acetic acid are added. The suspension which slowly turns yellow is stirred for 45 minutes at 40–45°, then cooled to 10° and filtered. The 2,5-dibromo-3,6-bis-benzoylamino-1,4-benzoquinone formed is washed with water and then with ethanol and dried. Yield: 183.3 parts=91.2% of the theoretical. M.P. 248° (under decomposition).

EXAMPLE 85

When, in the preceding Example 84, 157 parts of 2,5-di-(2'-chlorobenzoylamino)-1,4-benzoquinone (Example 1) are used instead of 138.6 parts of 2,5-di-benzoylamino-1,4-benzoquinone, then 2,5-di-(2'-chlorobenzoylamino)-3,6-dibromo-1,4-benzoquinone is obtained with a yield of 94%.

EXAMPLE 86

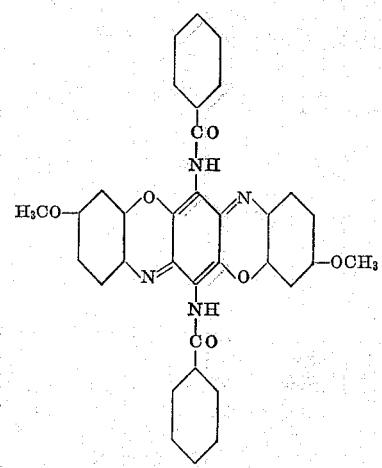

20.16 parts of 2,5-dibromo-3,6-bis-(benzoylamino)-1,4-benzoquinone obtained as described in Example 84, 12.3 parts of 1-amino-2,4-dimethoxybenzene and 13.1 parts of anhydrous sodium acetate are heated for 30 minutes at 200–210° in 250 parts by volume of 1-chloronaphthalene with stirring. The dark red suspension, which is formed, is filtered off at 140°, the residue is washed with ethanol, water, a mixture of ethyleneglycol monoethylether and diluted caustic soda, water and finally with acetone and then dried. 13.7 parts of a red-brown crystalline product of the above indicated formula are obtained. To obtain a fine dispersion it is ground with sodium chloride, sodium sulfate or anhydrous calcium chloride in the presence of a small quantity of the petroleum fraction, which boils at 180–220°. After the salt and solvent have been removed, a red pigment, which has a high color strength and good light, heat, overpainting, and migration fastness properties, is obtained.

When the 2,5-dibromo-3,6-bis(benzoylamino)-1,4-benzoquinone is replaced by 21.4 parts of 2,5-dibromo-3,6-bis(2'-methylbenzoylamino)-1,4-benzoquinone or by 21.4 parts of 2,5-dibromo-3,6-bis-(4'-methylbenzoylamino)-1,4-benzoquinone or by 22.9 parts of 2,5-dibromo-3,6-bis-(2'-chlorobenzoylamino) - 1,4 - benzoquinone and the process is otherwise carried out as indicated above, then the following red pigments are obtained: the 2,6-dimethoxy-9,10-bis-(2'-methylbenzoylamino)-triphenyldioxazine; the 2,6-dimethoxy-9,10-bis-(4'-methylbenzoylamino)-triphenyldioxazine; or the 2,6-dimethoxy - 9,10-bis-(2'-chlorobenzoylamino) - triphenyldioxazine. These pigments have properties which are as good as the 2,6-dimethoxy-9,10-bis-(benzoylamino)-triphenyldioxazine.

The 2,5-dibromo-3,6-bis-(benzoylamino) - 1,4 - benzoquinone employed are orange-brown compounds which are sparingly soluble in conventional organic solvents. They are obtained by means of oxidation of the relevant 3,6-bis-(benzoylamino)-1,4 - dimethoxy benzenes with nitric acid in glacial acetic acid, by subsequent bromination of 3,5-bis(benzoylamino)-1,4-benzoquinones formed with bromine in chloroform-2,5-dibromo-3,6-bis-(benzoylamino)-1,4-hydroquinones forming—and by further treatment with nitric acid in glacial acetic acid.

EXAMPLE 87

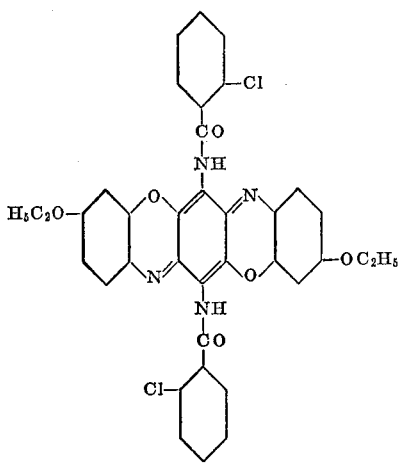

17.2 parts of 2,5-dibromo-3,6-bis-(2'-chlorobenzoyl-amino)-1,4-benzoquinone (Example 85) are mixed with 10.8 parts of 1-amino-2,4-diethoxybenzene and 9.8 parts of anhydrous sodium acetate, and the mixture is heated for 30 minutes at 200 to 210° in 200 parts by volume of 1 chloronaphthalene with stirring. The dioxazine formed is isolated as in Example 1. 12.6 parts of red-brown crystals having a green scintillation are obtained. After fine dispersion by grinding with inorganic salts, such as calcium chloride, a bluish-red pigment is obtained, which has a high color strength and very good light, heat, overpainting and migration fastness properties, and in particular a very pure shade.

Equally fast dioxazines, having equally good color strength, which have been produced from benzoquinone compounds of the general formula X and 1-amino-2,4-diethoxy-benzene in accordance with the method described in the above example, are recorded in the following Table V. Column 1 represents the substituents $R_1$ and $R_2$ of the benzoquinone employed, column 2 represents the shade of a polyvinyl chloride film colored with the dioxazine pigment.

TABLE V

| Expl. No. | $R_1$ and $R_2$ in formula I | Color in PVC film |
|---|---|---|
| 88 | -⌬ | Yellowish red. |
| 89 | -⌬-CH₃ | Bluish red. |
| 90 | -⌬-CH₃ | Yellowish red. |
| 91 | -⌬(CH₃)-CH₃ | Bluish red. |
| 92 | -⌬-OCH₃ | Yellowish red. |
| 93 | -⌬(Cl)-Cl | Bluish red. |
| 94 | -⌬-Cl | Yellowish red. |

EXAMPLE 95

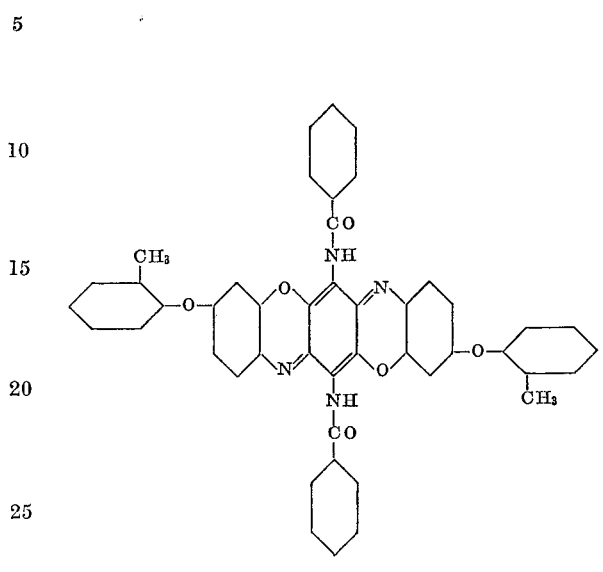

15.12 parts of 2,5-dibromo-3,6-bis-(benzoylamino)-1,4-benzoquinone are mixed with 18.3 parts of 1-amino-2,4-bis-(2'-methylphenoxy)-benzene and 9.2 parts of anhydrous sodium acetate, and the mixture is heated for 30 minutes at 200–210° in 200 parts by volume of 1-chloronaphthalene with stirring. The red dioxazine compound formed is isolated and purified as indicated in Example 84. 11.5 parts of a pure 2,6-bis-(2'-methylphenoxy)-9,10-bis-(benzoylamino)-triphenyldioxazine are obtained in the form of red-brown crystals having green scintillation. By grinding with inorganic salts, a red pigment, which has a high colour strength and excellent fastness to light, heat, over-painting and migration, is obtained. Red dioxazine pigments of similarly good properties are obtained by employing 17.2 parts of 2,5-dibromo-3,6-bis-(2'-chlorobenzoylamino)-1,4-benzoquinone or 17.2 parts of 2,5-dibromo-3,6-bis-(4'-chlorobenzoylamino)-1,4-benzoquinone or 21.4 parts of 2,5-dibromo-3,6-bis-)2',4'-dichlorobenzoylamino)-1,4-benzoquinone or 17.8 parts of 2,5 - dibromo - 3,6 - bis - (2' - methylbenzoylamino) - 1,4-benzoquinone or 17.8 parts of 2,5-dibromo-3,6-bis-(4'-methylbenzoylamino) - 1,4 - benzoquinone or 18.7 parts of 2,5-dibromo-3,6-bis-(3',4'-dimethylbenzoylamino)-1,4-benzoquinone or 18.8 parts of 2,5-dibromo-3,6-bis-(2'-methoxybenzoylamino)-1,4-benzoquinone or 18.8 parts of 2,5 - dibromo - 3,6 - bis - (4' - methoxybenzoylamino)-1,4-benzoquinone or 17.5 parts of 2,5-dinitro-3,6-bis-(3'-nitrobenzoylamino)-1,4-benzoquinone or 17.5 parts of 2,-5 - dinitro - 3,6 - bis - (4' - nitrobenzoylamino) - 1,4-benzoquinone instead of the 2,5-dibromo-3,6-bis-(benzoylamino)-1,4-benzoquinone and by otherwise effecting the process as indicated in the above example.

The 2,5-dinitro-3,6-bis-(3'-nitrobenzoylamino)-1,4-benzoquinone is produced by oxidation and nitration of the 3,6 - bis - (benzoylamino) - 1,4 - bis - methoxybenzene and the 2,5-dinitro-3,6-bis-(4'-nitrobenzoylamino)-1,4-benzoquinone is produced by oxidation and nitration of of the 3,6-bis-(4'-nitrobenzoylamino)-1,4-dimethoxybenzene with a mixture of concentrated nitric acid and concentrated sulfuric acid.

EXAMPLE 96

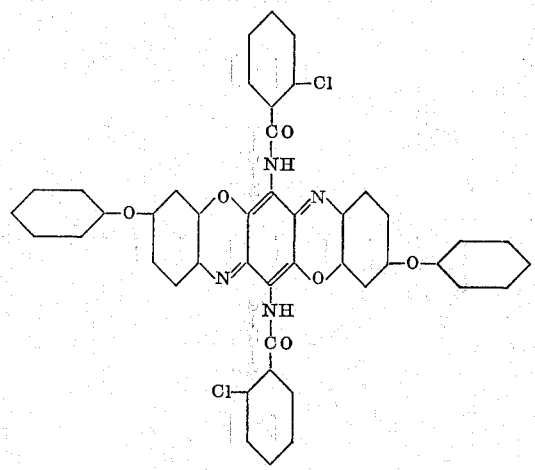

17.2 parts of 2,5-dibromo-3,6-bis-(2'-chlorobenzoyl-amino)-1,4-benzoquinone is mixed with 16.65 parts of 1-amino-2,4-bis-(phenoxy)-benzene and 9.2 parts of anhydrous sodium acetate, and the mixture is heated for 1 hour at 200–210° in 250 parts by volume of 1-chloro-naphthalene with stirring. The dioxazine compound formed is isolated as in Example 84. 15.8 parts of red-brown crystals are obtained, which yield a pure red pigment of high colour strength and very good light, heat, overpainting and migration fastness properties after grinding with $CaCl_2$.

Equally valuable red pigments of equally good properties are obtained if, in the above example 18.3 parts of 1-amino-2,4-bis-(4'-methylphenoxy)-benzene or 18.3 parts of 1-amino-2,4-bis-(3'-methylphenoxy)-benzene or 20.8 parts of 1-amino-2,4-bis-(4'-chlorophenoxy)-benzene or 20.2 parts of 1-amino-2,4-bis-(4'-methoxyphenoxy)-benzene or 19.7 parts of 1-amino-2,4-bis-(2',6'-dimethylphenoxy)-benzene or 22.8 parts of 1-amino-2,4-bis-(phenoxy)-5-benzoyl-benzene or 24.2 parts of 5-amino-2,4-bis-(4'-chlorophenoxy)-1-benzoic acid methylester or 27.9 parts of 5-amino-2,4-bis-(phenoxy)-1-benzoic acid-2',5'-dichloroanilide or 18.7 parts of 1-amino-2,4-bis-(phenoxy)-5-chloro-benzene or 18.7 parts of 1-amino-2,4-bis-(phenoxy)-3-chlorobenzene are used instead of the 1-amino-2,4-bis-(phenoxy)-benzene and the procedure is otherwise effected as indicated in the example.

EXAMPLE 97

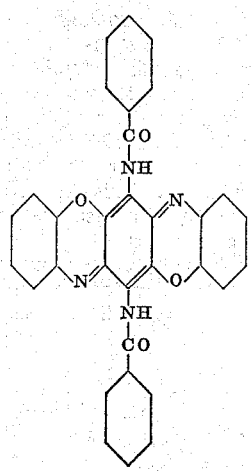

10.08 parts of 2,5-dibromo-3,6-bis-(benzoylamino)-1,4-benzoquinone is mixed with 6.15 parts of 2-methoxyaniline and 4.1 parts of anhydrous sodium acetate, and the mixture is heated for 6 hours to 120° in 150 parts by volume of o-dichlorobenzene. The dianil formed is filtered off cold and the residue is washed with o-dichlorobenzene, ethanol, water and acetone and dried. 10.8 parts of a grey-brown, crystalline dianil are obtained.

Formation of the relevant dioxazine compound results by heating the dianil for 1 hour in 200 parts by volume of 1-chloronaphthalene to 230° with thermal ring-closure. An orange-red solution is initially formed, from which the dioxazine compound immediately separates in the form of fine needles. It is drawn off by suction at 150°, washed with ethylglycol monoethyl ether and acetone and dried. 6.5 parts of orange-red crystals are obtained, which supply an orange pigment having very good fastness properties to solvents, overpainting, migration and light, by grinding with inorganic salts.

EXAMPLE 98

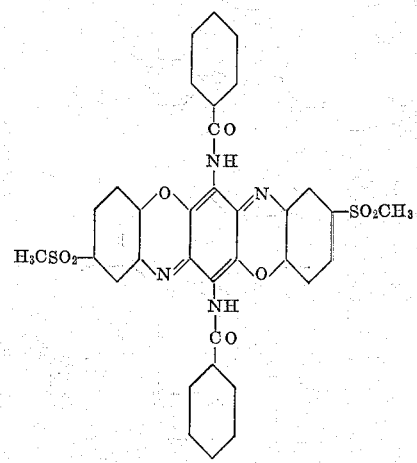

15.12 parts of 2,5-dibromo-3,6-bis-(benzoylamino)-1,4-benzoquinone is mixed with 15.8 parts of 1-amino-2-phenoxybenzene-5-methylsulfone and 9.2 parts of anhydrous sodium acetate, and the mixture is heated for 20 minutes to 120–130° in 200 parts by volume of 1-chloro-naphthalene, the suspension changing to a darker colour. The dianil formed in this way is then heated to 200° without isolation and kept at 200° for 1 hour with stirring.

The dioxazine formed is isolated and purified as indicated in Example 84. 9.3 parts of orange-brown crystals are obtained, which after grinding with $CaCl_2$ produce an orange pigment having good colour strength and excellent migration, overpainting and heat and light fastness properties.

In the following Table VI properties of similar dioxazines have been compiled, which have been produced from dianils of the general Formula XI in accordance with the method described in the above Example 94. Column 1 represents the substituents —NH—$A_1$ and —NH—$A_2$ of the dianil employed, column 2 represents the shade of polyvinylchloride film coloured with the finely dispersed dioxazine pigment of Formula XII which is obtained from the dianil of column 1 and in which $A_1'$ and $A_2'$ correspond to =N—A, and —N=$A_2$ minus the phenoxy substituent in o-position to —NH—.

TABLE VI

| Expl. No. | —NH—A₁ and —NH—A₂ in Formula XI | Colors in PVC film |
|---|---|---|
| 99 | —NH—⟨phenyl with SO₂C₂H₅ and O-phenyl⟩ | Orange. |
| 100 | —NH—⟨phenyl with CH₃ and O-phenyl⟩ | Orange-red. |
| 101 | —NH—⟨phenyl with Cl, CH₃ and O-phenyl⟩ | Do. |
| 102 | —NH—⟨phenyl with CONH-(dichlorophenyl) and O-phenyl⟩ | Do. |
| 103 | —NH—⟨phenyl with CONH-(chlorophenyl) and O-phenyl⟩ | Bordeaux. |
| 104 | —NH—⟨phenyl with CO-O-phenyl and O-phenyl⟩ | Reddish brown. |
| 105 | —NH—⟨phenyl with NHCO-phenyl and O-phenyl⟩ | Reddish blue. |
| 106 | —NH—⟨phenyl with Cl, NHCOCH₃ and O-phenyl⟩ | Reddish brown. |
| 107 | —NH—⟨phenyl with NHCOCH₃ and O-phenyl⟩ | Violet. |
| 108 | —NH—⟨phenyl with Cl, NHCO-phenyl and O-phenyl⟩ | Reddish violet. |

EXAMPLE 109

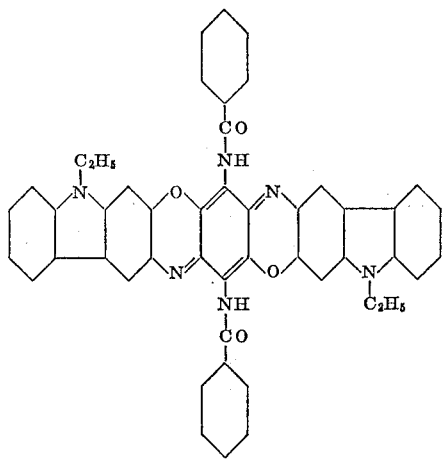

30.24 parts of 2,5-dibromo-3,5-bis-(benzoylamino)-1,4-benzoquinone, 25.2 parts of 3-amino-N-ethylcarbazole and 9.8 parts of anhydrous sodium acetate are heated for 30 minutes at 200–210° and then for 6 hours at 220° in 500 parts by volume of 1-chloronaphthalene with stirring. The dark suspension is filtered off at 150° and the residue is purified as indicated in Example 84. 12.9 parts of a dioxazine of the above-mentioned formula are obtained, which dioxazine produces a pure violet pigment having excellent light, heat, overpainting and migration fastness properties after grinding with salt.

EXAMPLE 110

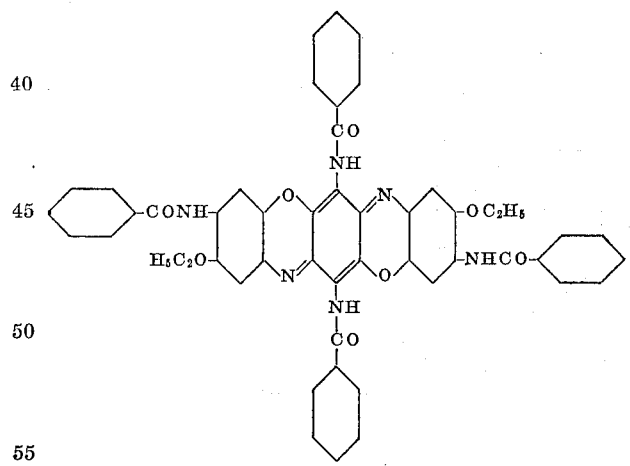

10.8 parts of 2,5-dibromo-3,6-bis-(benzoylamino)-1,4-benzoquinone, 12 parts of 1-amino-2,5-diethoxy-4-benzoylaminobenzene and 7.65 parts of tri-isopropanol amine are heated for 4 hours in 150 parts by volume of chlorobenzene under reflux. The precipitate which is formed in this manner is filtered off hot, washed with ethanol and water and dried. 14.4 parts of a grey-violet crystalline dianil are obtained. This product dissolves in a hot mixture of ethyleneglycol monoethylether and causic soda with a yellow-brown colour.

The dianil is heated for 40 minutes to 175° in 200 parts of o-dichlorobenzene for the purpose of conversion into the dioxazine compound. The suspension formed is filtered off at 150° and the green crystalline residue is washed with ethanol and acetone. 12 parts of a dioxazine compound are obtained, which produce a violet pigment having very good light, overpainting, heat and migration fastness properties after grinding with inorganic salts such as $CaCl_2$ or $Na_2SO_4$.

If the ring-closure is carried out in the presence of 10 parts of benzoyl chloride, then only 6 parts of the dioxazine compound are obtained.

The shades of polyvinyl chloride films, coloured with similar dioxazines pigments, are compiled in the following Table III (column 2); these dioxazine pigments were produced from dianils of the general Formula XI in accordance with the method described in the above example. Column 1 represents the substituents —NH—A$_1$ and NH—A$_2$ of the dianil employed.

TABLE VII

| Expl. No. | —NH—A$_1$ and —NH—A$_2$ in Formula XII | Color in PVC film |
|---|---|---|
| 111 | —NH—C$_6$H$_2$(OCH$_3$)$_2$—NHCOCH$_3$ | Violet. |
| 112 | —NH—C$_6$H$_2$(OCH$_3$)$_2$—NHXO—C$_6$H$_5$ | Do. |
| 113 | —NH—C$_6$H$_2$(OCH$_3$)$_2$—NHCO—C$_6$H$_4$Cl | Blue. |
| 114 | —NH—C$_6$H$_2$(OCH$_3$)$_2$—NHCO—C$_6$H$_4$—Cl | Do. |
| 115 | —NH—C$_6$H$_2$(OC$_2$H$_5$)$_2$—NHCO—CH$_3$ | Violet. |
| 116 | —NH—C$_6$H$_2$(OC$_2$H$_5$)$_2$—NHCO—C$_6$H$_4$—Cl | Blue. |
| 117 | —NH—C$_6$H$_2$(OC$_2$H$_5$)$_2$—NHCO—C$_6$H$_4$—CH$_3$ | Violet. |

EXAMPLE 118

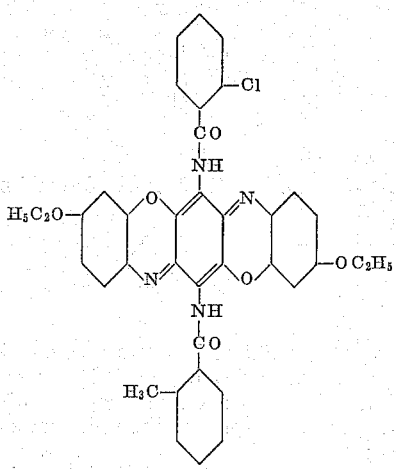

16.6 parts of 2,5-dibromo-3-(2'-chlorobenzoylamino)-6-(2'-methylbenzoylamino)-1,4-benzoquinone, 10.8 parts of 1-amino-2,4-diethoxybenzene and 9.8 parts of anhydrous sodium acetate are heated with stirring for 30 minutes at 200–210° in 200 parts by volume of 1-chloronaphthalene. The dioxazine pigment formed is isolated as in Example 84. 11.1 parts of red-brown crystals having a green scintillation are obtained. After the fine dispersion by means of grinding with salt, a bluish red pigment is obtained, which has similar properties to that described in Example 85.

The 2,5-dibromo - 3 - (2'-chlorobenzoylamino)-6-(2'-methylbenzoylamino)-1,4-benzoquinone was produced by means of oxidation with nitric acid in glacial acetic acid of the 3-(2'-chlorobenzoylamino)-6-(2'-methylbenzoylamino)-1,4-dimethoxybenzene to form the corresponding 1,4-benzoquinone and by subsequent bromination and oxidation.

EXAMPLE 119

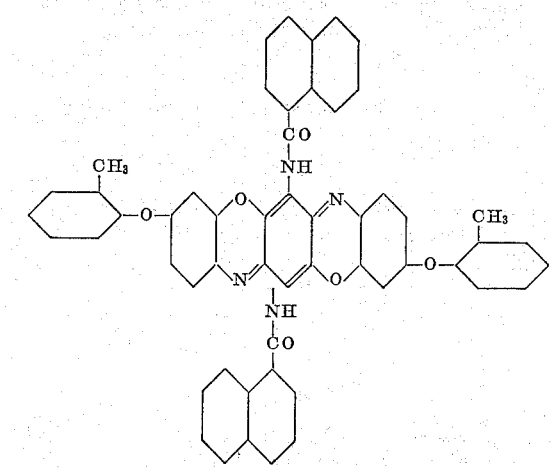

12.08 parts of 2,5-dibromo-3,6-bis-(1'-napthoylamino)-1,4-benzoquinone, 12.2 parts of 1-amino-2,4-bis-(2'-methylphenoxy)-benzene and 6.56 parts of anhydrous sodium acetate are heated for 30 minutes at 200–210° with stirring in 150 parts by volume of 1-chloronaphthalene. The red crystalline dioxazine compound formed is filtered off at 80° and processed as in Example 84. 4.1 parts of a pure 2,6-bis-(2'-methylphenoxy)-9,10-bis-(1'-naphthoylamino)-triphenyldioxazine are obtained. After grinding with calcium chloride a red pigment is obtained, which has a good colour strength, pure shade and good overpainting and migration fastness properties.

A bluish red pigment having excellent fastness to migration is also obtained if 15.8 parts of 5-amino-2,4-bis-(phenoxy)-benzoic acid anilide are used instead of the 1-amino-2,4-bis-(2'-methylphenoxy)-benzene and the procedure is otherwise effected as in the example.

EXAMPLE 120

For the purpose of producing a colour for graphic purposes, 2 parts of the pigment, produced in accordance with Example 8 from 1-amino-2,5-diethoxy-4-benzoylaminobenzene and 2,5-dibromo-3,6-bis-(benzoylamino)-1,4-benzoquinone and ground with salt, are mixed with 36 parts of hydrate of alumina, 60 parts of linseed oil varnish of average viscosity and 0.2 parts of cobalt linoleate and ground on the triple roll mill. Violet prints, which have a high colour strength and good fastness to light may be produced with this paste.

EXAMPLE 121

0.6 parts of the pigment, which is ground with salt and produced in accordance with Example 87 from 1-amino-2,4-bis-phenoxy-benzene, is mixed with 67 parts PVC, 33 parts dioctylphthalate, 2 parts of dibutyl tin dilaurate and 2 parts of titanium dioxide and are rolled at 140° for 10–15 minutes. Red PVC films, which have very good migration and light fastness properties, are obtained.

EXAMPLE 122

10 parts of titanium dioxide, 35 parts of a 60% solution of a modified urea alkyd resin in xylene/butanol 1:1, 10 parts of oil of turpentine and 5 parts of xylene are ground in a ball mill for 48 hours with 2 parts of the pigment produced in accordance with Example 85 from 1-amino-2,4-diethoxybenzene and 2,5-dibromo-3,6-bis-(2'-chlorobenzoylamino)-1,4-benzoquinone. If this coloured lacquer is poured on to aluminum foils and burnt-in for 1 hour at 120°, then varnishes are produced which are distinguished by an excellent pure bluish red shade and very good light, heat and overpainting fastness properties.

We claim:

1. A process for the production of dioxazine dyestuffs, comprising:

(a) mixing and heating at from about 30° to 250° C. a starting compound selected from the group consisting of the compounds of the formulae

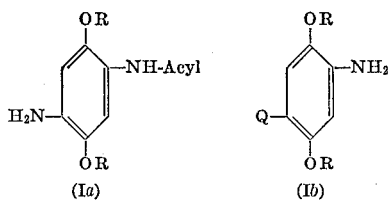

and

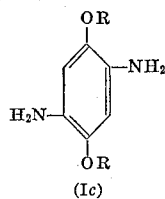

wherein

R is a member selected from the group consisting of lower alkyl, benzyl, phenyl, chlorophenyl, bromophenyl and lower alkylphenyl, Q is a member selected from the group consisting of chlorine, fluorine, phenoxy and lower alkoxy, Acyl is a member selected from the group consisting of an alkanoyl, chloro-alkanoyl, bromo-alkanoyl, alkoxy-alkanoyl, cyclo-alkanoyl, aralkanoyl, benzoyl, naphthoyl and alkoxy carbonyl, with an acylating agent selected from the group consisting of a compound of the formula

and a compound of the formula

wherein

Acyl has the above-given meaning, and
   Y is a member selected from the group consisting of chlorine and bromine, and separating the resulting compound of the formula

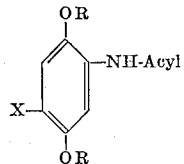

wherein

X is a member selected from the group consisting of phenoxy, lower alkoxy, chlorine, and fluorine, and R and Acyl have the aforesaid meanings, from the reaction mixture;

(b) mixing the recovered compound of Formula II in a liquid medium inert to oxidation with nitric acid having a strength of at least 0.5-normal, at a temperature of about 10° to 100° C., thereby oxidizing the last-mentioned compound to the corresponding one of the formula

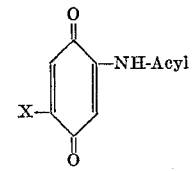

wherein Acyl and X have the aforesaid meanings, and separating the latter compound from the reaction mixture;

(c) mixing the aforesaid compound of Formula III in a solvent inert to halogenation, with a halogenating agent selected from the group consisting of bromine and chlorine at about 0° to 200°, thereby halogenating the compound of Formula III to a compound of the formula

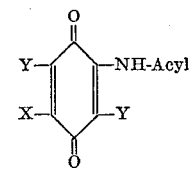

wherein Acyl, X and Y have the aforesaid meanings;

(d) mixing the aforesaid compound of Formula IV in an inert organic solvent having a boiling point of at least 70°, with at least 2 moles of an aromatic amine, at least part of the aromatic nucleus of which consists of a benzene ring substituted (1) with one —NH₂ group and
   (2) in one ortho-position thereto with a substituent Z selected from the group consisting of lower alkoxy, cycloalkoxy, mononuclear carbocyclic aralkoxy, carbocyclic aryloxy and carbocyclic arylthio;

and an acid-binding agent, and heating at least during the final phase of the ensuing reaction at a temperature of about 140° to 300° C., and maintaining, at least throughout said final phase of said ensuing reaction, a weakly acid medium, thereby obtaining a dioxazine of the formula

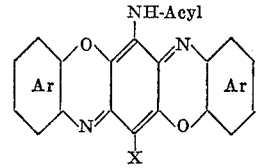

wherein Acyl and X have the aforesaid meanings, and

represents the radical of said aromatic amine, the benzene ring of which is condensed with the quinone ring of said compound of Formula IV under removal of the aforesaid substituent Z;

and recovering the dioxazine of Formula V from the reaction mixture.

2. A process as described in claim 1, wherein the reaction of step (a) is carried in an inert organic solvent.

3. A process as described in claim 1, wherein the inert organic solvent is unsubstituted aromatic hydrocarbon.

4. A process according to claim 1 wherein the inert organic solvent is halogenated aromatic hydrocarbon.

5. A process as described in claim 1, wherein step (a) is carried out with a mixture of a compound of the formula Acyl—Y, and with an acid-binding agent which is a member selected from the group consisting of an alkali metal acetate and an alkaline earth metal oxide, carbonate and hydroxide.

6. A process as described in claim 1, wherein the acid-binding agent used in step (d) is a member selected from the group consisting of an alkali metal acetate and a tri-lower alkyl-amine.

7. A process as described in claim 1, wherein the acid-binding agent used in step (d) is tri-isopropyl-amine.

8. A process as described in claim 1, wherein the aromatic nucleus of the aromatic amine used in step (d) is a member selected from the group consisting of

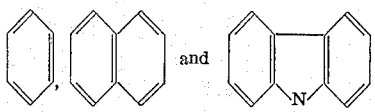

9. A process as described in claim 1, wherein step (d) is carried out at a temperature of about 150° to 260° in a solvent selected from the group consisting of dichlorobenzene, trichlorobenzene, nitrobenzene and chloronaphthalene.

10. A process as described in claim 1, wherein the reaction medium of step (d) is maintained weakly acid by addition thereto of a buffering agent.

11. A process as described in claim 10, wherein an excess of sodium acetate is used as the buffering agent.

12. A process as described in claim 1, wherein the nitric acid used has a strength ranging from that of 8-normal $HNO_3$ to fuming nitric acid.

13. A process as described in claim 1, wherein the nitric acid used is 10-normal.

14. A process as described in claim 1, wherein the reaction step (b) is carried out in glacial acetic acid as solvent.

15. A process as described in claim 1, wherein 3 to 4 moles of nitric acid are used per mole of the compound of Formula II.

16. A process as described in claim 1, wherein the reaction step (b) is carried out at a temperature of about 20° to 50° C.

17. A process for the production of dioxazine dyestuffs comprising the steps (a) through (c) described in claim 1, and further comprising (d) reacting the resulting compound of the Formula IV with at least 2 moles of an aromatic amine at least part of the aromatic nucleus of which consists of a benzene ring substituted with one —$NH_2$ group and at least one of the two ortho-positions to said —$NH_2$ being occupied by hydrogen and the other ortho-position being free from a substituent condensable with a quinonic oxygen atom of the compound of Formula IV;

an acid-binding agent and a mild oxidizing agent, and heating at a temperature of about 140° to 300° C. and maintaining throughout the ensuing reaction a weakly acid medium, thereby obtaining a dioxazine of the formula

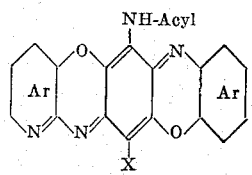

wherein Acyl and X have the aforesaid meanings, and

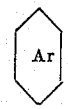

represents the radical of said aromatic amine condensed with its aforesaid benzene ring into said compound of Formula IV;

and recovering the dioxazine of Formula V from the reaction mixture.

18. A compound of the formula

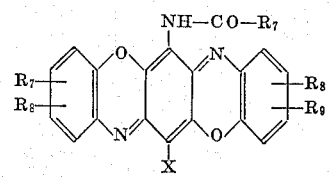

wherein

X is a member selected from the group consisting of chlorine, fluorine and —NH—CO—$R_7$, $R_7$ is a member selected from the group consisting of phenyl, chlorophenyl, bromophenyl and lower alkylphenyl, and $R_8$ is a member selected from the group consisting of lower alkoxy, phenoxy, chlorophenoxy, bromophenoxy, lower alkylphenoxy, lower alkoxyphenoxy, and $R_9$ is a member selected from the group consisting of hydrogen, bromo, chloro, fluoro and lower alkyl.

19. A compound of the formula

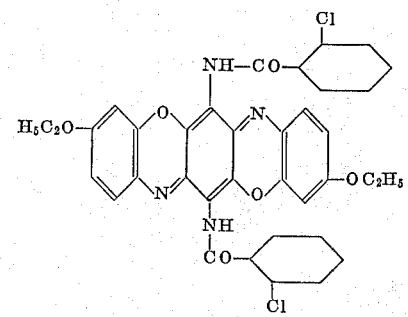

20. A compound of the formula

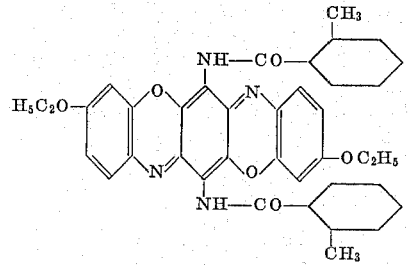

21. A compound of the formula

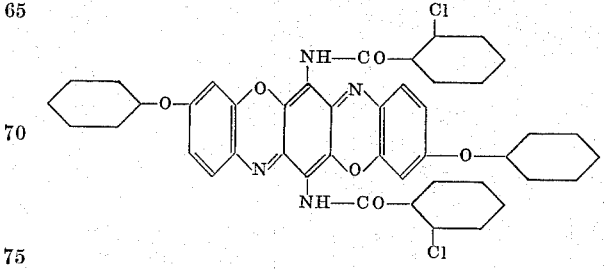

22. A compound of the formula
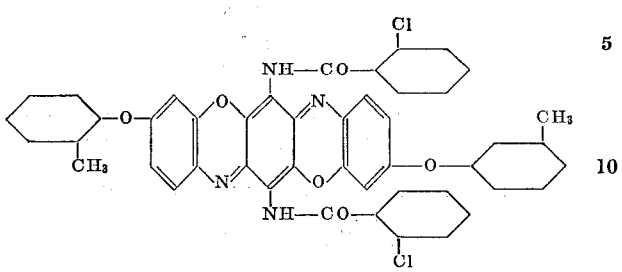
References Cited by the Examiner
UNITED STATES PATENTS
| | | | |
|---|---|---|---|
| 2,918,465 | 12/1959 | Lytle et al. | 260—246 |
| 2,970,152 | 1/1961 | Keller et al. | 260—396 |
| 3,022,298 | 2/1962 | Mory et al. | 260—246 |
| 3,037,995 | 6/1962 | Gauss et al. | 260—396 |
| 3,040,030 | 6/1962 | Marxer | 260—396 |
| 3,060,188 | 10/1962 | Marxer | 260—396 |
| 3,130,195 | 4/1964 | Von der Crane | 260—246 |
FOREIGN PATENTS
613,431  8/1962  Belgium.
WALTER A. MODANCE, *Primary Examiner.*
NICHOLAS S. RIZZO, JOHN D. RANDOLPH,
*Examiners.*